(12) United States Patent
Grivna

(10) Patent No.: US 6,385,745 B1
(45) Date of Patent: *May 7, 2002

(54) PHASE INDEPENDENT RECEIVER AND/OR DECODER

(75) Inventor: Edward L. Grivna, Brooklyn Park, MN (US)

(73) Assignee: Cypress Semiconductor Corp., San Jose, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/885,333

(22) Filed: Jun. 30, 1997

(51) Int. Cl.[7] .................................................. G06F 11/00
(52) U.S. Cl. .......................... 714/707; 360/13; 714/798
(58) Field of Search ................................. 714/707, 798; 341/40, 140; 386/21, 54, 96; 360/13; 352/13, 17; 370/503, 208, 445, 450; 375/377, 324, 364; 348/441, 578, 571, 705; 331/1 A, 25, DIG. 2

(56) References Cited

U.S. PATENT DOCUMENTS

| | | | | |
|---|---|---|---|---|
| 3,644,683 A | * | 2/1972 | Braun | 360/13 |
| 3,961,269 A | * | 6/1976 | Alvarez, Jr. | 328/62 |
| 5,185,722 A | * | 2/1993 | Ota et al. | 365/201 |
| 5,260,906 A | * | 11/1993 | Mizukami | 365/201 |
| 5,724,007 A | * | 3/1998 | Mar | 331/1 A |
| 5,754,254 A | * | 5/1998 | Kobayashi et al. | 348/578 |
| 5,844,849 A | * | 12/1998 | Furutani | 365/194 |
| 5,923,663 A | | 7/1999 | Bontemps et al. | 370/445 |

* cited by examiner

Primary Examiner—Albert Decady
Assistant Examiner—Guy J. Lamarre
(74) Attorney, Agent, or Firm—Christopher P. Maiorana, P.C.

(57) ABSTRACT

A circuit comprising a receiver configured to receive a first signal having a first phase, a second signal having a second phase opposite the first phase and an output configured to present either the first or second signals. A state machine may be configured to receive the output of the receiver circuit and to provide a control signal configured to select the first or second signals.

20 Claims, 3 Drawing Sheets

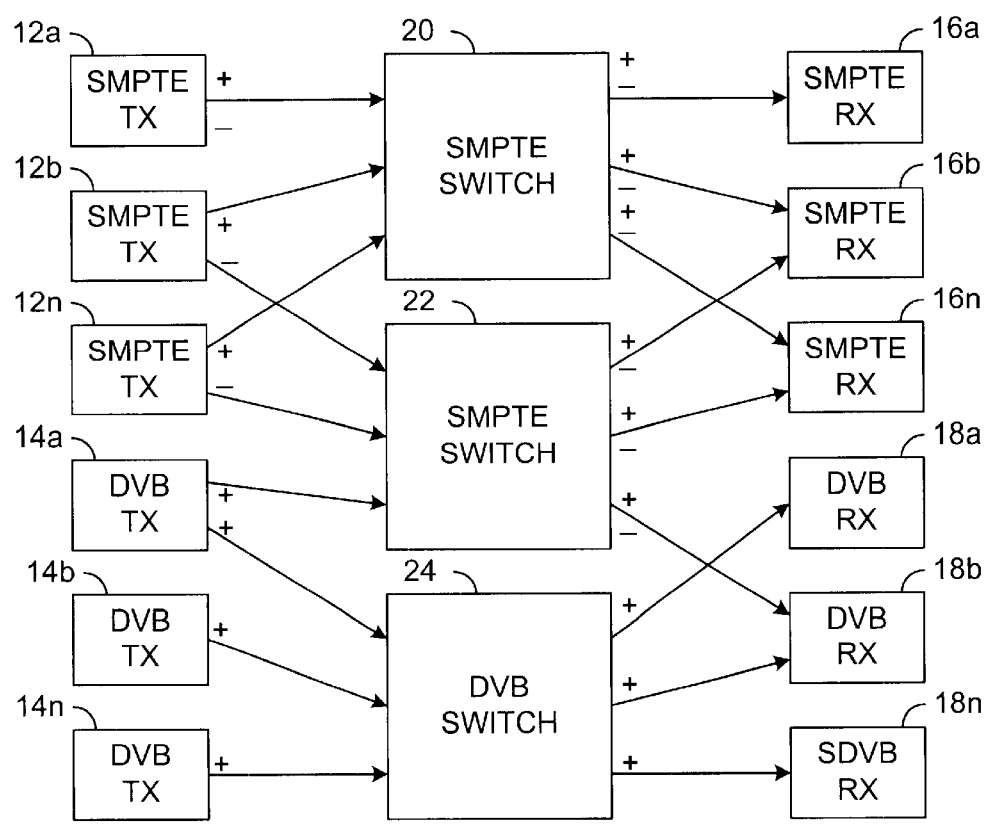
FIG. 1
(CONVENTIONAL)

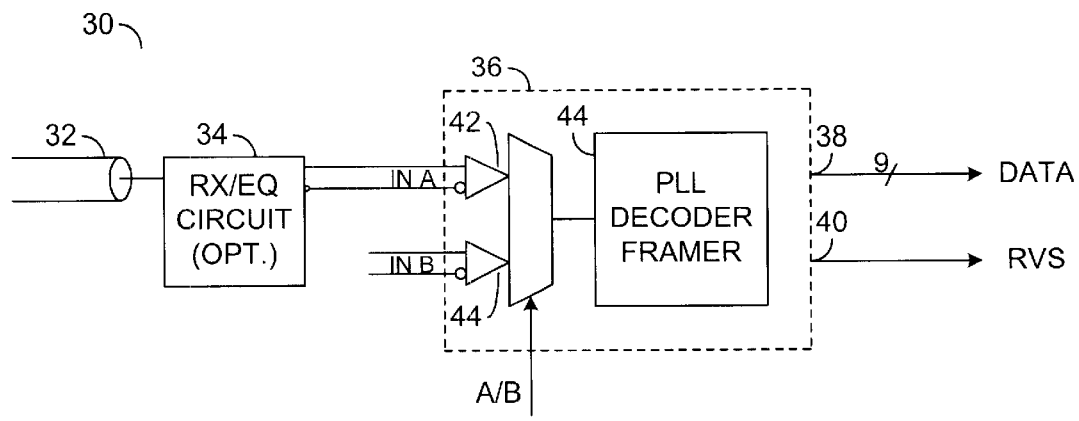
FIG. 2
(CONVENTIONAL)

PHASE INDEPENDENT RECEIVER AND/OR DECODER

FIELD OF THE INVENTION

The present invention relates to receiver/decoders generally and, more particularly, to a receiver/decoder for use with otherwise incompatible systems.

BACKGROUND OF THE INVENTION

The Society of Motion Picture and Television Engineers (SMPTE) has created a serial interface standard (the SMPTE-259M) for sending non-compressed component and composite digital video streams between various pieces of studio grade equipment. There is a large installed base of SMPTE-259M compliant equipment. The interface uses a phase independent form of signaling called NRZI (Non-Return-To-Zero, Invert on ones). The interface may present both true and complement data. One common form of SMPTE equipment is a serial switch that is used to route these video streams between other pieces of equipment.

Another common serial interface, the DVB-ASI (Digital Video Broadcast—Asynchronous Serial Interface) also makes use of a serial interface to route MPEG2 encoded video streams between pieces of equipment. The DVB-ASI interface makes use of an 8B/10B encoded data stream that, unlike SMPTE-259M, is sensitive to the phase of the data stream. Other than this one characteristic, both the DVB-ASI and SMPTE-259M physical interfaces are essentially identical. Both operate at or handle 270 Mbaud serial data, use 75 Ohm studio grade coax (e.g., Belden Type 8281), have the same launch amplitude (800 mV), connectors, etc. The physical similarity between the interfaces has led some video production studios to use standard SMPTE serial switches to route DVB-ASI data streams. Unfortunately, the configuration of such a system requires significant trial and error in connections (for proper operation) to find out which inputs/outputs do not introduce an inversion in the data stream.

FIG. 1 illustrates a conventional approach for interconnecting SMPTE and DVB devices. FIG. 1 comprises a number of SMPTE transmit devices 12a, 12b and 12n, a number of DVB transmit devices 14a, 14b and 14n, a number of SMPTE receive devices 16a, 16b and 16n, a number of DVB receive devices 18a, 18b and 18n, a SMPTE switch 20, a SMPTE switch 22 and a DVB switch 24. Since the SMPTE transmit devices 12a–12n and the SMPTE receive devices 16a–16n are base and dependent devices, the SMPTE switches 20 and 22 may present signals at either the true (+) or complement (−) outputs. However, the DVB transmit devices 14a–14n and the DVB receive devices 18a–18n are phase dependent devices. When connected through the DVB switch 24, a true phase is maintained between the DVB transmit devices 14a–14n and the DVB receive devices 18a–18n. The DVB transmit device 14a is shown connected through the SMPTE switch 22. In such a configuration, it is important to maintain the positive phase at the output of the SMPTE switch 22 prior to presenting it to the DVB receive device 18b. Conventional approaches require the implementation of either DVB-ASI specific equipment, or identification of ports on SMPTE equipment that do not introduce an inversion in the data stream.

Referring to FIG. 2, a block diagram of a conventional circuit 30 is shown. The circuit 30 generally comprises data cable 32, a receive equalization circuit 34 and a logic circuit 36. A logic circuit 36 generally presents a framed and decoded data signal at an output 38 and an error detected signal RVS at an output 40. The logic 36 generally comprises a differential amplifier 42 and a decoder framer 44. The signal received by the circuit 30 must have a proper phase relationship in order for the decoder framer 44 to provide a proper functioning at the output 38. See, for example, U.S. patent application Ser. No. 08/658,760, now U.S. Pat. No. 5,754,011 filed Jun. 5, 1996, the appropriate sections which are hereby incorporated by reference.

The existing methods all have significant drawbacks for video studios implementing DVB-ASI. Such studios must either abandon their existing SMPTE switches when they add on DVB-ASI compliant equipment, duplicate and segregate their existing switches into SMPTE and DVB cable plants, or reduce the usable port capacity of their SMPTE equipment by a factor of two. The costs and logistics of any of these techniques could significantly slow the adoption of DVB-ASI.

SUMMARY OF THE INVENTION

The present invention concerns a circuit comprising a receiver configured to receive a first signal having a first phase, a second signal having a second phase opposite the first phase and an output configured to present either the first or second signals. A state machine may be configured to receive the output of the receiver circuit and to provide a control signal configured to select the first or second signal.

The objects, features and advantages of the present invention include providing a phase independent transmit and/or receive device that may be implemented using switches that may invert the polarity of the signal and may independently and/or automatically compensates for phase inversions.

BRIEF DESCRIPTION OF THE DRAWINGS

These and other objects, features and advantages of the present invention will be apparent from the following detailed description and the appended claims and drawings in which:

FIG. 1 is a block diagram of a conventional approach implemented in combination with the conventional transmit and receive devices.

FIG. 2 is a block diagram of a conventional receive device;

DETAILED DESCRIPTION OF THE PREFERRED EMBODIMENTS

The present invention comprises a receiver configured with both the INA and INB differential input pairs wired in parallel, with INA+ and INB− tied together, and INA− and INB+ tied together. In addition, the present invention comprises a state machine that monitors the decoded output of the receiver, and alternatively enables either the INA or INB input based on the characteristics and number of errors detected by the receiver. As a result, the receiver may operate with both true and complement data streams, as output by, for example, a SMPTE-259M port used to route DVB-ASI data streams.

Figure 3:
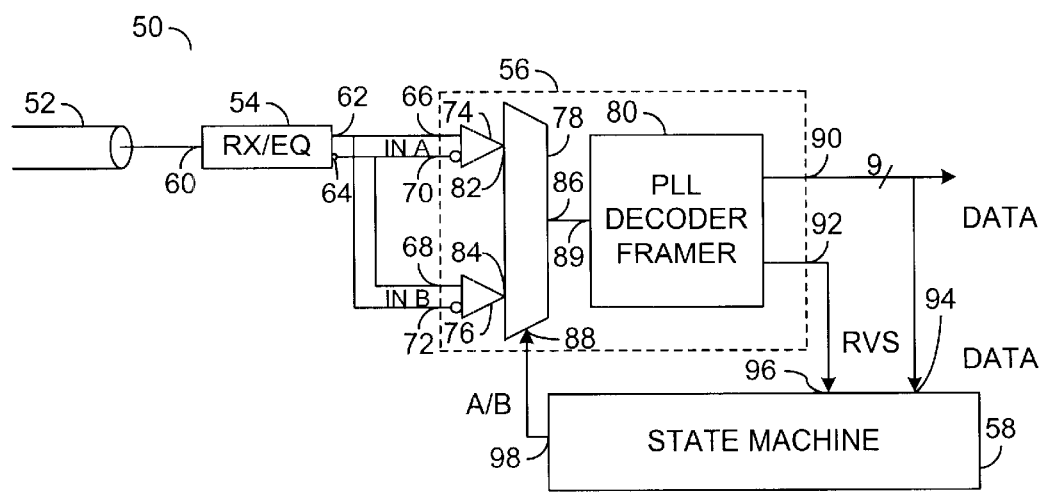
FIG. 3 is a block diagram of a preferred embodiment of the present invention.

Referring to FIG. 3, a block diagram of a circuit 50 is shown in accordance with a preferred embodiment of the present invention. The circuit 50 generally comprises a data cable 52, a receive equalization circuit 54, a logic circuit 56 and a state machine circuit 58. The receive equalization circuit 54 has an input 60 that generally receives a serial data signal from the data cable 52. The receive equalization circuit 54 generally has an output 62 that may present a first signal and an output 64 that may present a second signal. The first signal is generally presented to an input 66 and an input 72 of the logic 56. The second signal, a complement of the first signal, is generally presented to an input 68 and an input 70 of the logic 56. The circuit 50 may be implemented as a receiver.

The logic 56 generally comprises a differential amplifier 74 (e.g., INA), a differential amplifier 76 (e.g., INB), a multiplexer 78 and a PLL/decoder/framer 80. The second signal is generally presented to the inverting input of the differential amplifier 74 and the non-inverting input of the differential amplifier 76. Conversely, the first signal is generally presented to the inverting input of the differential amplifier 76 and the non-inverting input of the differential amplifier 74. As a result, the differential amplifier 74 generally receives phase inverted signals (i.e., the signals have the opposite phase of the signals received by the differential amplifier 76). The non-inverting input in each of the amplifiers 74 and 76 may be considered a true input, while the inverting input may be considered a complement input. The differential amplifier 74 generally presents a signal to an input 82 of the multiplexer 78 while the differential amplifier 76 generally presents a signal to an input 84 of the multiplexer 78. The multiplexer 78 presents a signal at an output 86 that may be derived from either the input 82 or the input 84 in response to the toggling of a control signal (e.g., A/B) received at an input 88. The output 86 is generally presented to an input 88 of the PLL/decoder/framer 80. The PLL/decoder/framer 80 generally presents a data signal (e.g., DATA) at an output 90 and an error signal (e.g., RVS) at an output 92. The output 90 may be implemented as a multi-bit bus (e.g., a 9-bit bus) in order to meet the design criteria of a particular application. The signal DATA presented at the output 90 may be presented to an input 94 of the state machine 58.

The signal RVS may be presented to an input 96 of the state machine 58. The state machine 58 generally presents the signal A/B at an output 98 in response to the signals received at the inputs 94 and 96. The state machine 58 generally presents the signal A/B that may be an invert control signal used by the multiplexer 78 to provide a properly phased signal at the output 86.

The state machine 58 may be implemented using logic devices, standard components or other devices. In a standard DVB-ASI interface, only one of the INA or INB differential inputs may be generally required if phase correction is not required. By using both INA and INB inputs of the logic circuit 56, control of the phase of the signal presented at the output 86 may be obtained.

The first signal may be presented to the INA+ input and the INB− input. The second signal may be presented to the INA−input INB+ input. By then selecting either the INA or INB input pair, it may be possible to invert the incoming data stream. Because source data may be switched between multiple sources, each of which may have true or complement data, the selection of the INA or INB differential pair must generally be both dynamic and automatic. The selection is generally controlled by the state machine 58 that monitors the data stream received at the input 94 for characters not meeting all requirements of the particular operating protocol (e.g., the 8B/10B code).

The state machine 58 is generally designed and adapted to operate with specific data characteristics of the incoming data stream. In such a stream, small packets may be sent with a high mix of k28.5 or synchronizing (e.g., SYNC) framing characters transmitted as part of the data stream. These framing characters may be bunched or interspersed with the data characters. Two SYNC characters generally immediately precede the first character of each (188 or 204 byte) MPEG packet. This general design constraint may be based on the needs of the multi-byte framer to guarantee proper framing of data streams before the start of each packet.

The equalizer circuit 54 may not be required in certain design applications, and is not generally required by the present DVB-ASI specification. However, the equalizer circuit 54 may provide additional standard harmonization efforts between EBU and SMPTE standards bodies and may be a future requirement. If the receive equalizer circuit 54 is not present, then the coax data cable 32 may be transformer coupled to the inputs of the receiver circuit 56.

The state machine 58 generally monitors the data bus for receive errors (e.g., RVS) and for SYNC characters. A receive error RVS may be considered an error even if detected on SYNC characters. However, valid SYNC characters are not considered valid characters in terms of determining that the receiver is in the proper phase.

The state machine 58 may comprise, in one example, a 4-bit counter and a 7-state supervisor state machine that may respond to an active high signal and/or character. The state machine 58 may monitor errors, while the counter may be used to monitor valid data characters. The counter may be enabled under control of a supervisor state machine.

Figure 4:
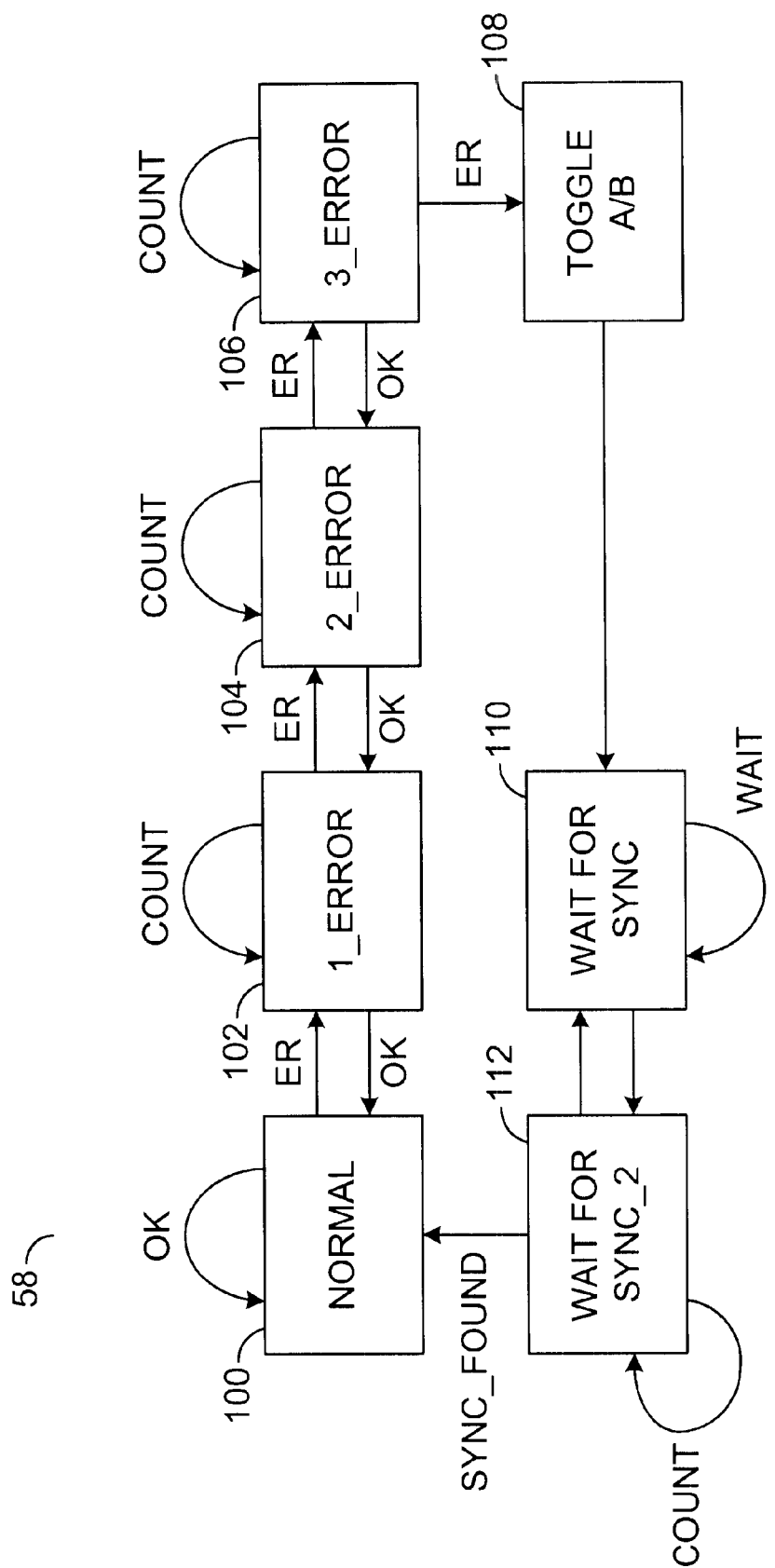
FIG. 4 is a diagram of the operation of the state machine in accordance with the preferred embodiment of the present invention.

FIG. 4 illustrates the operation of the state machine 58. The state machine 58 generally comprises a normal state 100, a 1_ERROR state 102, a 2_ERROR state 104, a 3_ERROR state 106, a toggle A/B state 108, a WAIT_FOR_SYNC state 110 and a WAIT_FOR_SYNC_2 state 112. The states 100–112 generally represent the various states of the state machine 58.

The state machine 58 may start in any state. For purposes of explanation, if the state machine 58 has just left the TOGGLE_A/B state 108 and entered the WAIT_FOR_SYNC state 110, the state machine 58 generally monitors the data signal received at the input 94 for a valid SYNC code. The state machine 58 will generally remain in the state 110 until a valid SYNC is located.

Once a SYNC code is found, the state machine 58 generally advances to the WAIT_SYNC_2 state 112. In the state 112 the reset may be removed from the external counter allowing the counter to be enabled to begin counting. The state machine 58 continues to look for a second SYNC character. If a second SYNC character is located before the counter reaches predetermined value (e.g., 3) the state machine 58 generally advances to the NORMAL state 100. If a SYNC is not detected prior to the counter reaching the predetermined value, the state machine 58 generally returns to the WAIT_FOR_SYNC state 110.

In the NORMAL state 110, the counter is generally reset and the state machine 58 may begin monitoring the input 94 for any RVS errors. If no error is detected, the state machine 58 generally remains in the NORMAL state 110. If an error is detected, the state machine 58 generally advances to the 1_ERROR state 102.

While in the 1_ERROR state 102, the reset may be removed from the counter, allowing the counter to count valid data characters. If the counter reaches its maximum count before an error is detected, the state machine 58 may return to the NORMAL state 100. If an error is detected, the counter is generally reset and the state machine 58 may advance to the 2_ERROR state 104. The maximum count of the state 102 counter may be a predetermined number that may be adjusted to meet the design criteria of a particular application.

While in the 2_ERROR state 104, the reset may be removed from the counter and may be allowed to count valid data characters. If the counter reaches its maximum count before an error is detected, the state machine 58 may return to the 1_ERROR state 102. If an error is detected the counter is reset and the state machine 58 may advance to the 3_ERROR state 106. The maximum count of the of the state 104 counter may be adjusted to meet the design criteria of a particular application.

While in the 3_ERROR state 106, the reset may be removed from the counter and may be allowed to count valid data characters. If the counter reaches its maximum count before an error is detected, the state machine may return to the 2_ERROR state 104. If an error is detected the counter is reset and the machine advances to the TOGGLE_A/B state.

The states 102, 104 and 106 generally provide a cascaded error detection system that may be implemented to allow a certain number of errors that are within a statistical probability while triggering (or toggling) the signal A/B in the event that the ratio of invalid characters to valid characters exceeds the statistical probability. The statistical probability may be programmed accordingly to meet the design criteria of a particular application.

While in the TOGGLE_A/B state 108, the input 88 may be toggled to select the alternate phase of the input serial data stream. From the TOGGLE_A/B state 108, the state machine 58 may advance to the WAIT_FOR_SYNC state 110, thus completing one inversion of the phase of the incoming data stream.

The present invention may allow the ports of SMPTE switches to be used without concern for the active state of the data stream. It may allow both true and complement data streams to be switched to it without concerns for the state of the source or the number of intermediate phase inversions to the data stream. The present invention may automatically correct inversion errors that could slow design development.

The state machine 58 may be implemented directly on the PLL/decoder/framer 80 or may be implemented as a discrete component. Alternate quantities of error count or valid character may also be implemented. However, due to the large numbers of SYNC codes in the DVB-ASI video streams (and because both disparities of the character are exact copies of their inversions) the SYNC codes are generally not counted as valid characters in the data stream.

While the invention has been particularly shown and described with reference to the preferred embodiments thereof, it will be understood by those skilled in the art that various changes in form and details may be made without departing from the spirit and scope of the invention.

What is claimed is:

1. A circuit comprising:
   a receiver circuit configured to (a) receive (i) a first data signal having a first phase, (ii) a second data signal having a second phase opposite said first phase and (iii) a control input, and (b) present an output comprising (i) said first data signal when said control input is in a first state and (ii) said second data signal when said control input is in a second state; and
   a state machine configured to receive said output of said receiver circuit and to provide said control input configured to select either said first or second data signal, in response to data characteristics of said output.

2. The circuit according to claim 1, wherein:
   said first data signal comprises a first true signal having said first phase and a first complement signal having said second phase; and
   said second data signal comprises a second true signal having said second phase and a second complement signal having said first phase.

3. The circuit according to claim 1 further comprising a multiplexer configured to present one of said first and second data signals in response to said control input.

4. The circuit according to claim 1, wherein said receiver circuit further comprises an error output.

5. The circuit according to claim 4, wherein said state machine presents said control input in response to said error output and said output of said receive circuit.

6. The circuit according to claim 4, wherein said state machine is further configured to count to a number of errors of said error output.

7. The circuit according to claim 6, wherein said number of errors is configurable.

8. The circuit according to claim 1, wherein said state machine toggles said control input in response to a predetermined ratio of invalid characters to valid characters of said output.

9. A transmitter and/or receiver comprising the circuit of claim 1.

10. The circuit according to claim 1, wherein said state machine is further configured to adapt to specific data characteristics of an incoming data stream.

11. A circuit comprising:
    a receiver circuit configured to (a) receive (i) a first data signal having a first phase and (ii) a second data signal having a second phase opposite said first phase and (b) present an output comprising (i) said first data signal when a first state is detected and (ii) said second data signal when a second state is detected; and
    logic configured to receive said output of said receiver circuit and to control said first and second states, in response to data characteristics of said output.

12. The circuit according to claim 11, wherein:
    said first data signal comprises a first true signal having said first phase and a first complement signal having said second phase; and
    said second data signal comprises a second true signal having said second phase and a second complement signal having said first phase.

13. The circuit according to claim 11, further comprising a multiplexer configured to present one of said first and second data signals in response to said logic.

14. The circuit according to claim 11, wherein said receive circuit further comprises an error output.

15. The circuit according to claim 14, wherein said logic controls said receiver circuit in response to said error output and said output of said receiver circuit.

16. The circuit according to claim 15, wherein said logic controls said receiver circuit in response to a predetermined ratio of invalid characters to valid characters received from said error output.

17. The circuit according to claim 11, further comprising an output circuit configured to present a differential output signal in response to an input signal.

18. A method for inverting the phase of a data signal comprising the steps of:
    determining a ratio of invalid characters to valid characters; and internally changing the phase of said data signal in response to said ratio exceeding a predetermined value.

19. The method according to claim 18, wherein said determining step further comprising the steps of:

counting a number of valid characters; and counting a number of invalid characters.

20. The method according to claim 19 further comprising the step of:

repeating said counting steps a predetermined number of times prior to said changing step.

* * * * *